United States Patent [19]
Wilson

[11] Patent Number: 5,603,182
[45] Date of Patent: Feb. 18, 1997

[54] DIP BAIT WORM

[76] Inventor: Richard Wilson, 610 Division, Dixon, Ill. 61021

[21] Appl. No.: 406,494

[22] Filed: Mar. 20, 1995

[51] Int. Cl.⁶ .......................... A01K 85/01; A01K 97/02
[52] U.S. Cl. ............................. 43/44.99; 43/44.2
[58] Field of Search ................... 43/42.06, 44.9, 43/44.99, 44.4, 44.2

[56] References Cited

U.S. PATENT DOCUMENTS

| | | | |
|---|---|---|---|
| 1,611,644 | 12/1926 | Johnson | 43/42.06 |
| 2,600,314 | 6/1952 | Miner | 43/42.2 X |
| 2,846,805 | 8/1958 | Waitzman | 43/42.06 |
| 4,603,502 | 8/1986 | MacDonald | 43/44.99 X |
| 4,788,788 | 12/1988 | Brockett | 43/44.2 X |
| 4,870,776 | 10/1989 | Schock | 43/42.06 X |

FOREIGN PATENT DOCUMENTS 2128061  4/1985  United Kingdom ................. 43/44.99

Primary Examiner—J. Elpel

[57] ABSTRACT

A dip cheese catfish bait lure is provided that allows for a variety of advantages for fishermen. The lure has a durable hollow rubber tube into which a plurality of holes have been provided. The tube has a straight forward angled scoop design with one hole provided. A connecting loop leader is threaded through the one hole provided in the scoop, back into and through the inner length of the tube by way of one of the plurality of holes and exits the back end of the tube where a treble hook is secured to the leader. The rubber tubing insures less bait loss when casting and provides longer fishing time between baitings. In use, the forward angled scoop design lure is filled and coated with dip cheese catfish bait which oozes from the surface and plurality of holes on the lure tube providing a long lasting chumming effect.

6 Claims, 1 Drawing Sheet

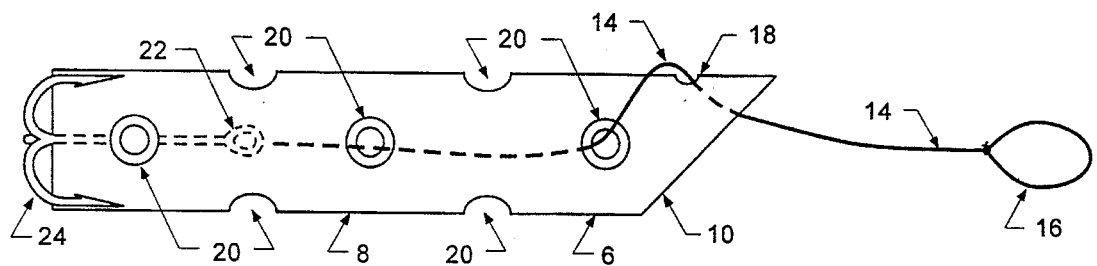
(FIG. 1)
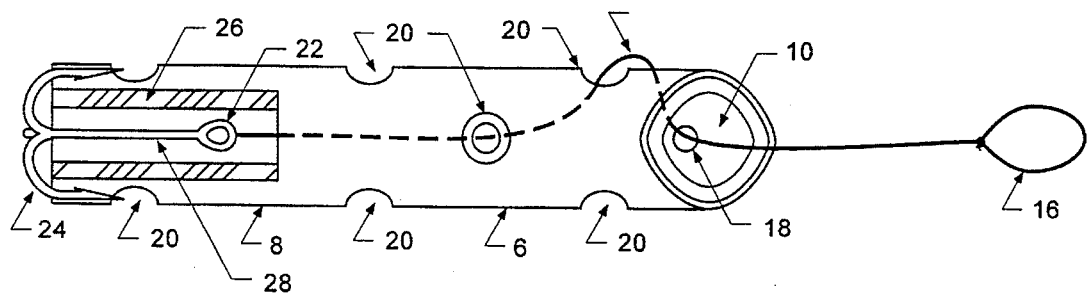
(FIG. 2)
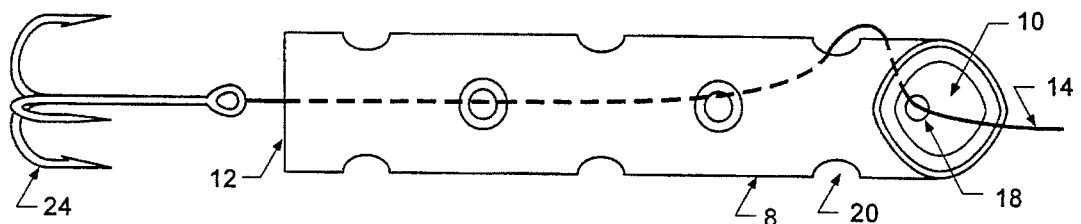
(FIG. 3)
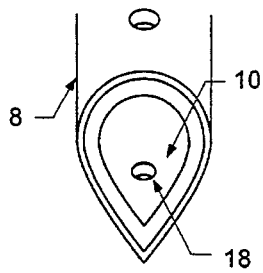
(FIG. 4)

DIP BAIT WORM

BACKGROUND

When fishing with viscous bait paste, generally referred to as dip cheese catfish bait, it is highly desirable to capture bait on the inside and outside of the lure. For this purpose, I have found that it is an advantage to cut the forward end of a hollow rubber tube at an angle. The angle forms a scoop to direct bait into and around the lure tube. It is also advantageous for the bait to slowly leak out of the lure tube. A plurality of holes provided along the sides of the lure tube will allow the bait to ooze out. When removing the hook from a fish, the lure often hinders quick hook removal. Also, snagging the hook when drying the lure can be dangerous and time consuming. I have found it desirable for the lure to slide away from the hook.

For the above reasons, I feel that my invention is new and desirable. I have incorporated a hollow rubber tube for the main body of my dip bait worm lure. The forward end of the lure tube has been cut at a straight angle of approximately 45 degrees and does not protrude above or below the lure tube. The scoop is in no way designed to create movement of the lure tube. The function of the scoop is to channel a greater amount of bait to the inside and outside walls of the lure tube as the tube is submerged in and pulled through or from a tub of dip cheese catfish bait. I have punched a lead line hole in the front end of the scoop. A leader is threaded through the lead line hole provided in the scoop. The leader is then threaded back through one of the plurality of holes in the lure tube and pulled through and out of the back end of the tube. A hook is attached to the leader with a knot. A connecting loop is tied on the front end of the leader The lure tube can be slid up the leader away from the hook to facilitate quick hook removal and safe maintenance of the lure. However, threading the leader through the lead line hole and back through one of the plurality of holes creates a frictional engagement of the lure and leader which hinders a catfish from pushing the lure away from the hook. This feature facilitates better hook sets.

In use, bait slowly oozes from the lure tube through the plurality of holes in the wall of the tube. A long lasting chumming effect is created, and a milky cloud begins to form around the lure. Catfish are generally known to be bottom feeding fish which feed primarily by smell and taste. Catfish are attracted by the strong smelling bait in and around the lure tube.

SUMMARY

This invention provides a new fishing lure device that allows for a great variety of advantages for the catfish angler. Many anglers today are using a viscous bait paste, generally known as dip cheese catfish bait. There are several problems associated with using this type of bait. It smells bad and is messy to use. Dip cheese catfish bait is generally of a sticky nature made of stinking cheese and whatever else the angler decides to add to his bait. One problem is finding a material that does not absorb water and is readily adhered to by the bait. The bait will not stick well to a wet lure and tends to fly off when cast, or completely wash off on impact as the lure hits the water. The more bait that is left on the lure when it reaches the bottom, the longer the chumming effect will last that attracts catfish to the lure. The lure must also be of a design which allows bait to slowly ooze from the lure to create the needed chumming effect. Hook removal and maintenance of the lure can often be difficult, dangerous, and time consuming if the lure does not slide up the leader away from the hook. However, if the lure slides too easily, the catfish may push the lure away from the hook, thus lessening the effectiveness of the lure.

For these reasons, I have invented a new dip bait worm lure that can be quickly and cleanly loaded with a greater amount of dip cheese catfish bait. The lure does not absorb water and is easily dried. The lure features a hollow rubber tube that provides longer fishing time between baitings and insures less bait loss when casting. The forward end of the lure tube has been cut at a straight angle of approximately 45 degrees to form a scoop. The function of the scoop is to channel a greater amount of bait to the inside and outside walls of the lure tube as the tube is submerged in and pulled through or from a tub of dip cheese catfish bait. Having bait trapped inside the lure tube insures that the bait is less likely to wash off when the lure tube impacts the surface of the water. I have provided a plurality of holes in the wall of the lure tube to allow bait to slowly ooze from the inside of the tube. One lead line hole is provided in the front of the scoop, and a leader is threaded through the hole. The leader is then threaded back through one of the plurality of holes in the tube and pulled through and out of the back end of the tube. A treble hook is attached to the leader with a knot. A connecting loop is tied on the front end of the leader.

The angler often gets bait on his hands and clothing when trying to cover or fill his dip bait worm lure with bait. When baiting my new lure tube, the angler may submerge the lure in the bait then the lure may be pulled out of the container of bait by grasping and pulling on the leader. The angler is less likely to get bait on his hands or clothing. The scoop channels a greater amount of bait to the inside and outside of the lure tube and baiting becomes much easier and more effective.

The lure may be slid up the leader away from the hook to facilitate quick, easy hook removal and safer maintenance of the lure. However, threading the leader through the lead line hole and back through one of the plurality of holes creates a frictional engagement of the lure and leader which hinders a catfish from pushing the lure away from the hook. This feature facilitates better hook sets.

The rubber lure tube is extremely durable and not easily destroyed or chewed up by catfish. The lure is fully assembled and ready to be attached to the angler's fishing line. If the leader or hook become damaged, the angler may easily thread a new leader or tie a new hook on the leader.

My invention addresses the problems faced by today's catfish angler. It provides a quicker, cleaner, safer, more effective way of catfishing with dip cheese catfish bait that saves the angler time and money.

BRIEF DESCRIPTION OF DRAWINGS

FIG. 1 is a side view of the lure tube of the preferred embodiment of this invention.

FIG. 2 is a top view of the device of FIG. 1 with a cut away portion to clearly show shank and eye of hook.

FIG. 3 is a top view of the device of FIG. 1 with lure tube slid away from the hook.

FIG. 4 is a front end view of the device of FIG. 1.

REFERENCE NUMERALS IN DRAWINGS

| | |
|---|---|
| 6 | dip bait worm lure |
| 8 | hollow rubber tube |
| 10 | scoop end |
| 12 | rear hook end |
| 14 | fishing line leader |
| 16 | connecting loop |
| 18 | lead line hole |
| 20 | bait dispensing hole |
| 22 | eye of hook |
| 24 | hook |
| 26 | cut away section |
| 28 | hook shank |

DESCRIPTION OF PREFERRED EMBODIMENT

Referring to FIG. 1, my dip bait worm lure, indicated by the numeral 6, incorporates a hollow rubber tube 8. The forward end of tube 8 has been cut at a straight forward angle of approximately 45 degrees to form a scoop 10. The scoop 10 does not protrude above or below the tube 8. A fishing line leader 14 with a connecting loop 16 thereon is seen entering and exiting the scoop end 10 from the inside to the outside wall of tube 8 through a lead line hole 18. The leader 14 then re-enters the inside of tube 8 through a dispersing hole 20 and is pulled through the length of tube 8 where it is attached with a knot to the hook eye 22 of the hook 24 at the rear end 12 of the tube 8.

In FIG. 2, the scoop 10 is more clearly illustrated. The scoop 10 is designed to channel and push dip cheese catfish bait to the inside and outside walls of the tube 8 as the lure 6 is submerged in and pulled through or from the angler's bait container. The bait dispersing holes 20 are incorporated to facilitate slow oozing of the trapped bait to provide a chumming effect during use to attract catfish. Another advantage of dispersing holes 20 becomes apparent as the angler submerges, stirs, and mashes the lure 6 in a container of bait with a stirring device. The tube 8 is compressed and depressed. This compressing and depressing action creates a suction effect which draws bait into the tube 8 through dispersing holes 20. This suction effect helps the scoop 10 pack the inside of the tube 8 full of bait. The dispersing holes 20 are also adapted to be threaded by the leader 14. Near the rear portion of the lure 6, a cut away section 26 has been provided in tube 8 to clearly show hook 24 attached to leader 14 at hook eye 22. This illustration also shows a clear view of the hook shank 28.

FIG. 3 shows the threaded leader 14 in relationship to the lead line hole 18, scoop 10, and dispersing hole 20, and hook 24. A variety of advantages are created for the angler. As the leader 14 is pulled tight, frictional resistance between the rubber tube 8 and the leader 14 is created. This resistance feature hinders a catfish from pushing the tube 8 up the leader 14 away from the hook 24, thus leaving the hook 24 in a better position for a good hook set. However, the angler may pull the tube 8 up the leader 14 to allow clear access when removing the hook 24 from a fish. This sliding feature also allows maintenance of the lure 6 with less chance of a dangerous, painful, or tedious encounter with the hook 24. The leader 14 helps to keep the scoop 10 in a straight, bait channeling position. It should be noted that, although my illustration shows a preferred treble hook, any type of hook may be substituted.

FIG. 4 is a front view of the lure tube 8. The scoop 10 and lead line hole 18 are shown as part of the front end design of the lure tube 8.

The within-described invention may be embodied in other specific forms, material and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. An easy loading dip bait worm lure comprising;
    a cylindrical, constant diameter, flexible linear tube defining a main body and a scoop, said main body having a plurality of holes in a wall thereof sized for dispensing bait, said tube having an straight cut angled forward end forming said scoop, said scoop having a leader line hole in a wall thereof sized for receiving a leader line;
    a leader line having a connecting loop at one end thereof, said leader line threaded through said scoop from inside said scoop to outside said tube through said leader line hole, said leader line threaded back inside said tube through one of said plurality of holes in said main body and said leader line threaded out an open back end of said tube opposite said scoop, said leader line attached to a hook.

2. The lure of claim 1, wherein said tube is in frictional engagement with said leader, said tube adapted to slide toward and away from said hook on said leader.

3. The lure of claim 1, wherein said tube is made of rubber material.

4. The lure of claim 1, wherein said tube angled forward end is cut at a straight angle of approximately 45 degrees to form said scoop.

5. The lure of claim 1, wherein said hook is a treble hook.

6. An easy loading dip bait worm lure comprising;
    a cylindrical, constant diameter, flexible linear tube defining a main body portion, a scoop portion and a longitudinal axis, the main body portion being a portion of said tube and having a constant diameter linear cylindrical wall, said scoop portion being at one of end of said tube defined by straight traverse angled cut, said cut end being approximately 45 degrees traverse to said longitudinal axis,
    a plurality of holes in said main body portion traverse to said longitudinal axis of said tube, a lead line hole in said scoop traverse to said longitudinal axis of said tube, wherein said plurality of holes in said main body portion are sized for passage of bait therethrough, and said lead line hole is sized for receiving a lead line therethrough.

* * * * *